T. UMRATH.
MILKING MACHINE.
APPLICATION FILED JUNE 27, 1908.
1,010,203.
Patented Nov. 28, 1911.
4 SHEETS—SHEET 2.
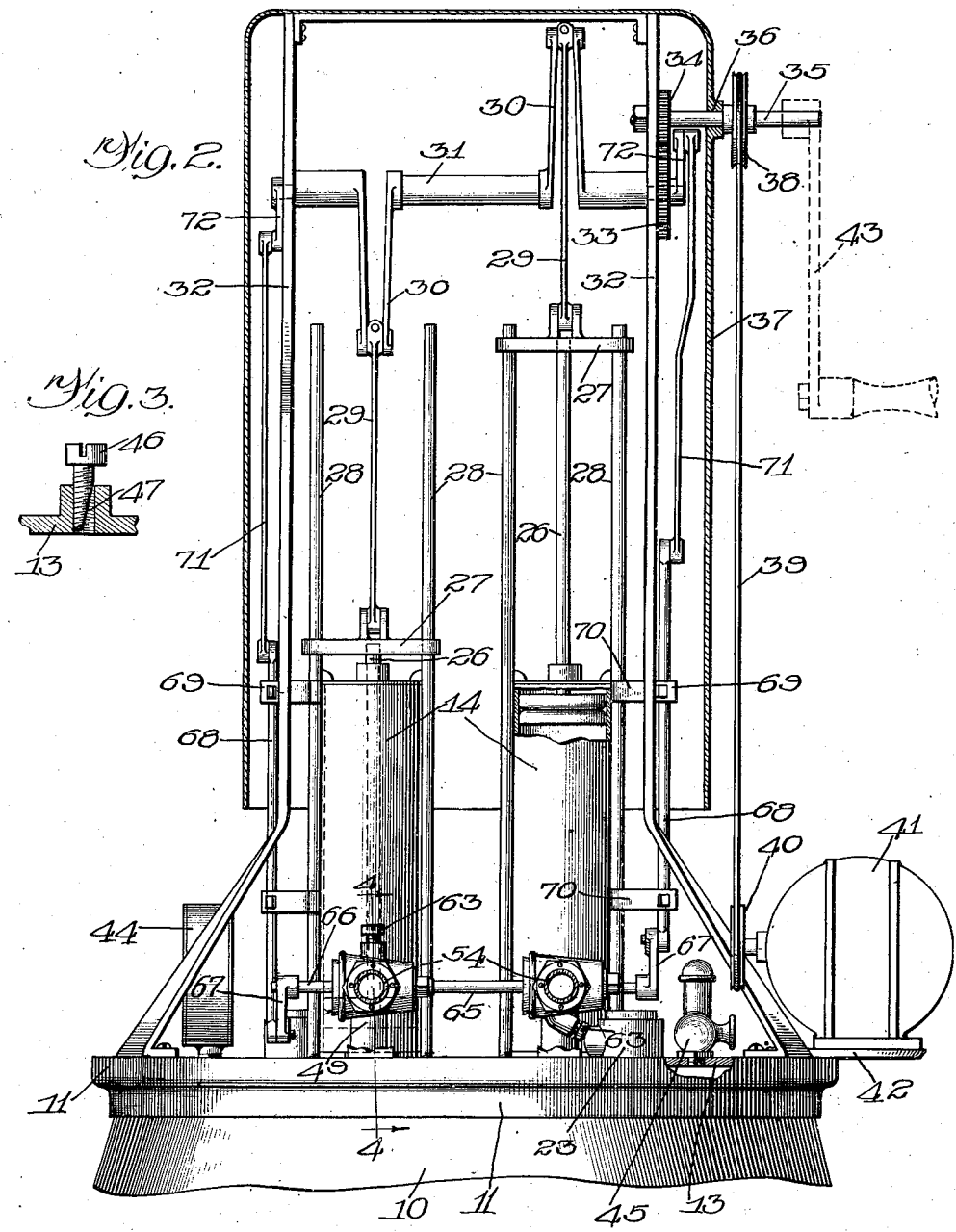

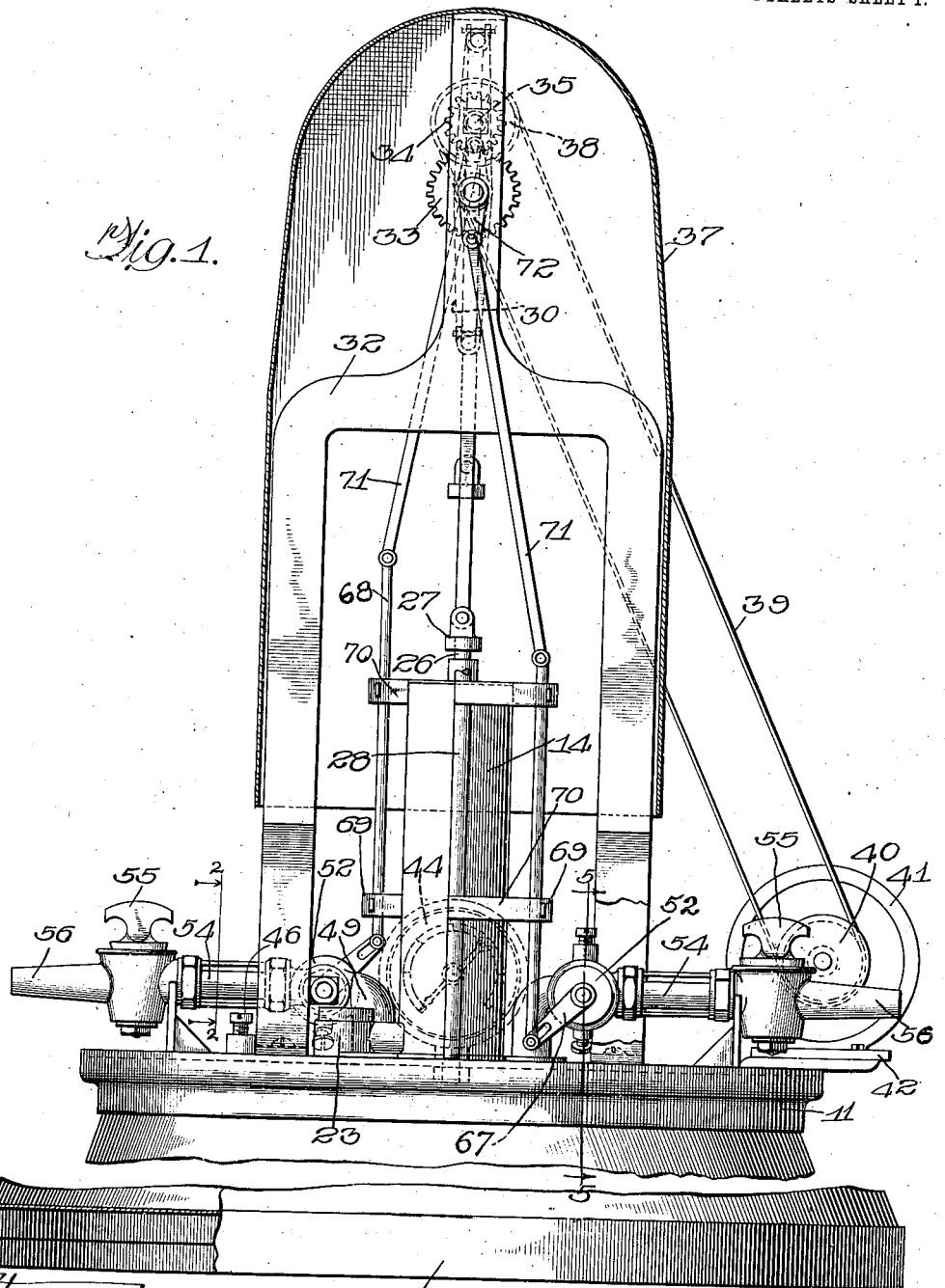

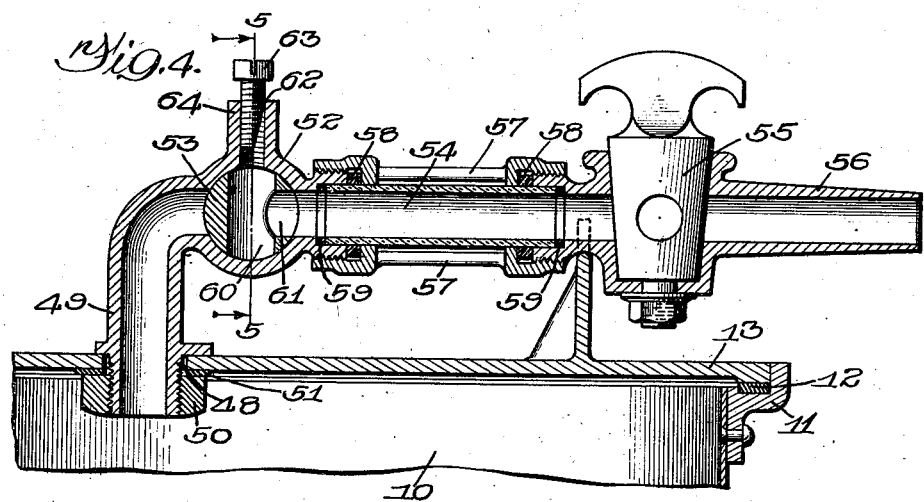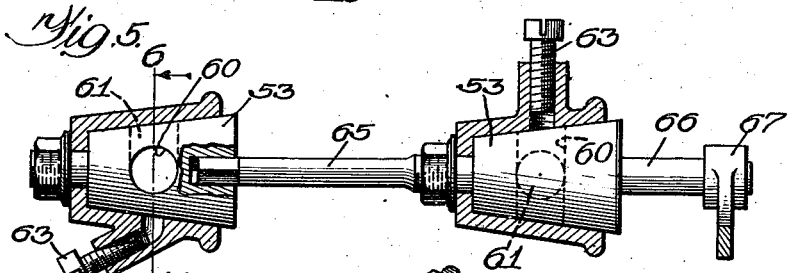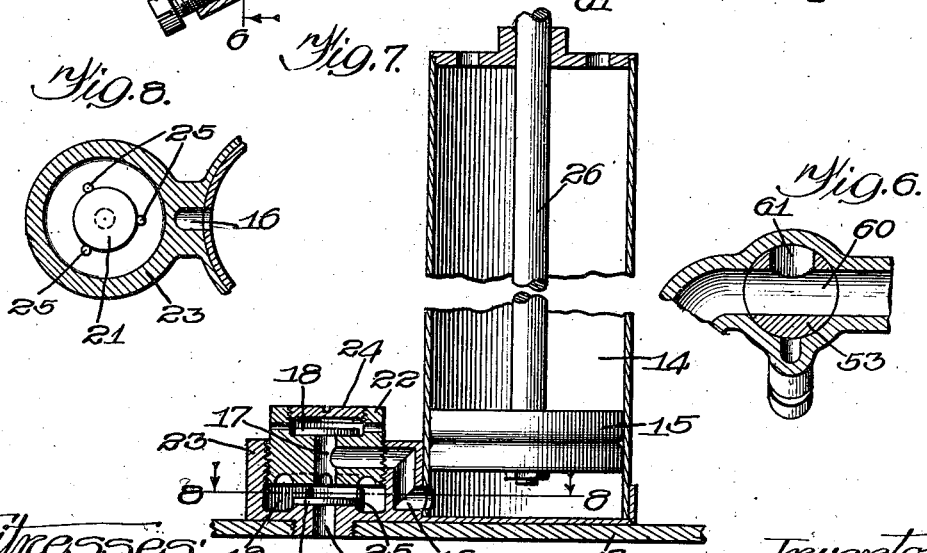

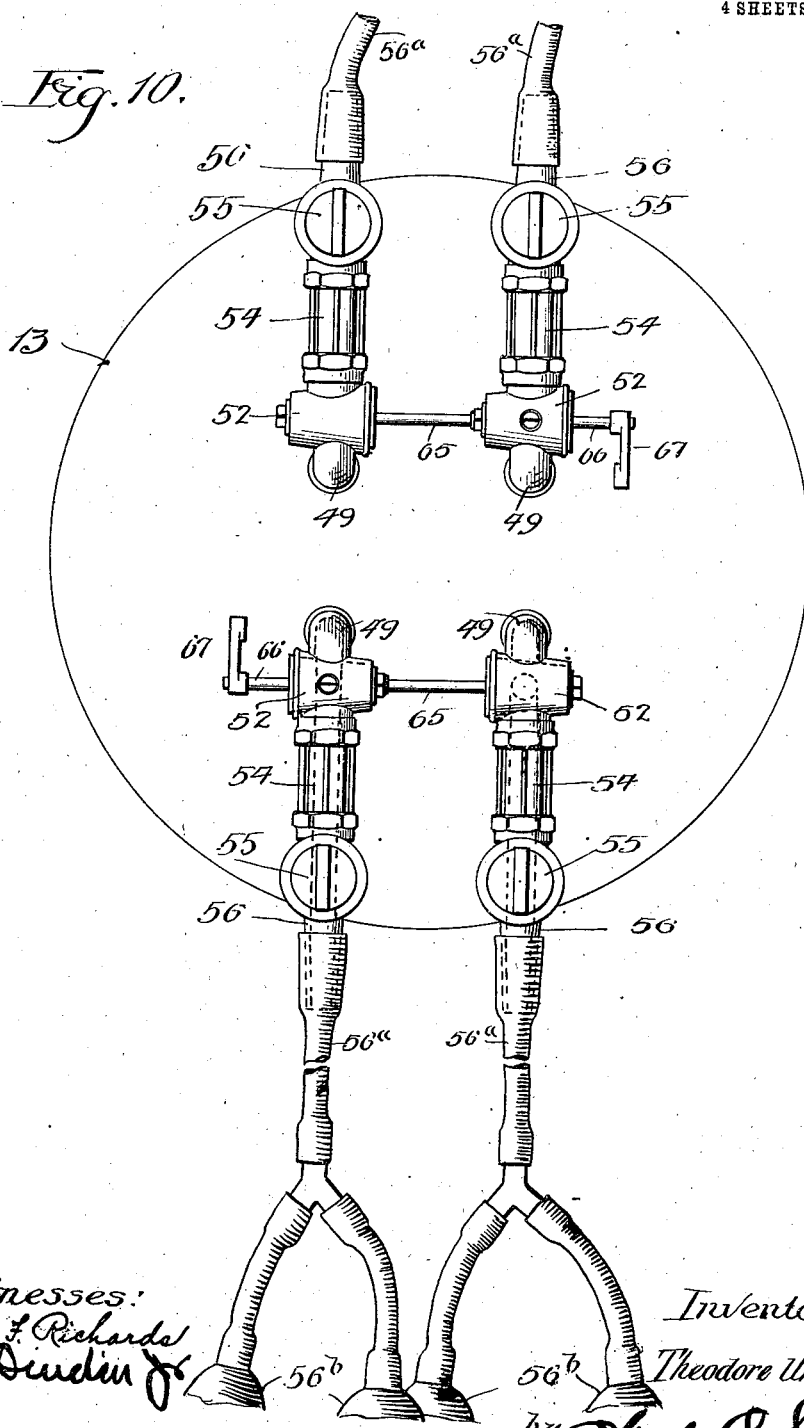

UNITED STATES PATENT OFFICE.

THEODORE UMRATH, OF CHICAGO, ILLINOIS, ASSIGNOR, BY DIRECT AND MESNE ASSIGNMENTS, TO LIBERTY COW MILKER COMPANY, OF HAMMOND, INDIANA, A CORPORATION OF INDIANA.

MILKING-MACHINE.

1,010,203.      Specification of Letters Patent.     Patented Nov. 28, 1911.

Application filed June 27, 1908. Serial No. 440,609.

*To all whom it may concern:*

Be it known that I, THEODORE UMRATH, a citizen of the United States, residing at Chicago, in the county of Cook and State of Illinois, have invented new and useful Improvements in Milking-Machines, of which the following is a full, clear, concise, and exact description, reference being had to the accompanying drawing, forming a part of this specification.

This invention relates to improvements in machines for milking animals, such as cows, and belongs to that class of milking machines which operate by suction and employ what is termed a "pulsating vacuum." In machines of this class it is important that the fluctuations of the vacuum be controlled with respect to frequency, and also with respect to the difference between the maximum and minimum suction exerted, so as to make the action of the machine correspond, as nearly as possible, to that to which the animal would be subjected were the milk being extracted naturally. It is also important that the force of the action of the machine be accurately regulated so that while the force applied will be sufficiently great to effect the extraction of the milk, yet it will never be so great as to injure the animal.

The object of my invention is to provide a simple and efficient machine which accomplishes the above results.

In the accompanying drawings I have shown my invention embodied in a small portable machine adapted to be placed upon the top of a large bucket or can, such as is commonly known and used among dairymen, the base of the machine forming the cover of said can. When the machine is placed upon the can and power is applied to drive the moving parts of the machine, a partial vacuum is created within the receptacle by the action of one or more pumps forming part of the machine. From the machine extend tubes to the animal or animals being milked, and upon the ends of these tubes are arranged teat cups, which may be of any approved form or such as are commonly used with machines of this class. By the operation of the machine these tubes are alternately placed in communication with the interior of the receptacle and with the atmosphere, the vacuum being thereby permitted to act upon the udder for a limited time with its full force and being then shut off and air permitted to flow into the tube, whereby the suction is momentarily reduced and the udder of the animal relieved. Preferably the suction upon the tube is not absolutely relieved at any time while the operation of milking is proceeding, as this would permit the cups to fall from their positions, but means are provided for regulating the amount of air admitted to the tube, the result being that a practically continuous flow of milk is maintained, the milk moving faster for a short interval and then slower for a short interval. The rapidity with which these intervals alternate with each other varies with the speed with which the machine is driven.

In the drawings, Figure 1 is an elevational view, partly sectional, of the machine in position on the receptacle, part of said receptacle being broken away to reduce the size of the figure, the flexible milking tubes being omitted; Fig. 2 is another elevational view of the machine, looking at the same from a different point, this view being partly sectional on the line 2—2 of Fig. 1, looking in the direction of the arrows, the casing or housing which covers the upper portion of the machine being shown in section in this figure, as well as in Fig. 1; Fig. 3 is a sectional view in detail, showing a regulating screw for controlling the degree of exhaustion of the space within the receptacle. Fig. 4 shows a longitudinal section taken through one of the inlet ducts through which the milk comes to the receptacle, showing one of the pulsation valves and a cock for closing the duct, the section being taken on the line 4—4 of Fig. 2, looking in the direction indicated by the arrows; Fig. 5 shows a section taken on the lines 5—5 of Figs. 1 and 4, looking in the direction indicated by the arrows, and illustrates the method by which two pulsation valves on the same side of the machine are connected to be operated by the same means; Fig. 6 shows a section taken through the left hand valve in Fig. 5, this section being taken on the line 6—6 of Fig. 5; Fig. 7 shows a vertical section through one of the pumps; Fig. 8 shows a horizontal section through a chamber containing the valves of the pump, this section being taken on the line 8—8 of Fig. 7, looking downward; Fig. 9 is a broken elevational view, partly sectional, of a screw plug which screws into the valve chamber of the pump and closes the upper portion of the same; and Fig. 10 is a plan of the cover and milk duct structures and showing fragments of the milk tubes.

In the several figures of the drawings, in which like reference numerals indicate the same parts throughout, 10 indicates the can, bucket or other receptacle upon which the machine is placed when the same is to be operated. Around the upper portion of the receptacle 10 is secured a ring 11, having a depression in its upper surface, in which depression lies a gasket ring 12 of rubber, leather or other yielding material. The base 13 of the machine consists of a disk, the edge of which rests upon the gasket ring 12 and thus closes the receptacle air tight. Mounted on this cover or base are one or more pump cylinders 14 preferably two in number. These cylinders 14 communicate with the interior of the receptacle 10 through a valve chamber (as illustrated in Fig. 7), a valve being arranged to open upon the up stroke of the piston 15 and to close upon the down stroke thereof, at the same time that a second valve opens to the atmosphere. The port 16, leading from the valve chamber, opens into a passage 17 at the upper end of which is a valve 18 which consists of a leather or rubber disk and which is held to its seat when the piston 15 is moving upwardly, and is lifted from its seat to permit the air to flow past it to the atmosphere upon the down stroke of the piston. The lower end of the passage 17 leads downward to a chamber 19 from which leads a passage 20 to the receptacle. Covering the upper end of the passage 20 is a disk valve 21 which lifts when the piston is moving upwardly, but at other times remains seated. The valve may be so constructed that the passage 17 and the chamber for the valve 18 are contained in a plug 22 which screws into the upper portion of the chamber in the main body of the valve casing 23. This plug 22 is provided with a second screw-threaded plug 24 which screws into and closes the upper portion of the chamber of the valve 18. To keep the valve 21 in position over its port 20, and at the same time to permit this valve to move toward and away from its seat, I provide three pins 25, arranged around the valve 21 and serving as guides.

The piston 15 is arranged on the lower end of a piston rod 26 and is made to fit practically air tight in the cylinder by means of leather or rubber rings as is common in pumps. Each of the piston rods 26 is provided with a cross piece 27 which slides up and down on guide rods 28 when the piston is reciprocated. The outer end of each of the piston rods is attached to one end of a pitman rod 29, the opposite end of this rod being rotatably attached to the wrist pin of one of the cranks 30 of a crank shaft 31. This crank shaft is supported in suitable bearings in a frame 32 which is secured to the base 13 of the machine. Suitable means are provided for rotating the shaft 31, such means conveniently comprising a gear wheel 33 on one end of the shaft 31, meshing with a pinion 34 carried on a counter-shaft 35. The counter-shaft is supported in a suitable bearing in one of the standards of the machine frame 32, another bearing for this counter-shaft being provided in the housing 37 which incloses the upper portion of the machine and extends down around most of the moving parts thereof. Upon the counter-shaft 35, outside the housing 37 is arranged a pulley 38 on which runs a belt 39 driven by a pulley 40 on the shaft of an electric motor 41. The base 42 of the motor is secured upon the base 13 of the machine. In case the motor 41 cannot be operated, because of failure of the electric current or damage to the motor, or in case no motor be provided and it is desired to operate the machine by hand power, a crank 43, which is shown in dotted lines in Fig. 2, may be secured to the outer end of the counter-shaft 35. By the movement of the pistons 15 up and down in the cylinders 14, air is drawn from the receptacle and a partial vacuum is created. The extent of the exhaustion of the air within the receptacle may be determined from inspection of a vacuum gage 44 mounted upon the base 13 and opening therethrough. To regulate the degree of vacuum attained and thus prevent the degree of exhaustion from passing a predetermined limit, there is also mounted upon the base 13 a safety valve 45. An admission-regulating screw 46 is also provided in the base 13 which, when turned outwardly, opens a port 47 (see Fig. 3), the size of the opening being regulated by the adjustment of the screw.

The base 13 is formed with a plurality of openings 48, preferably four in number, and in each of these openings is secured a casting 49 having an end inserted through the opening 48 and having a nut 50 threaded thereon, a rubber gasket 51 being inserted between the nut 50 and the base 13 to make an air tight connection. The opposite end of the casting 49 is enlarged to form a valve casing 52 in which is arranged an oscillating three-way valve 53. Secured to the side of the valve casing 52 is a glass tube 54, at the outer end of which is arranged a shut-off cock 55. The neck 56 of this cock is made tapering to receive the end of the flexible milking tube 56ª. The glass tube 54 is protected by rods 57 so as to guard against accidental breakage, and suitable gaskets 58 and 59 are provided to insure the tightness of the connection between the glass tube and the metal parts of the valve chamber and the cock 55.

The machine is preferably provided with four of the above described milk duct structures arranged in pairs as shown in Fig. 10, the two of each pair extending side by side and projecting outward from the center of the machine. The flexible milking tubes 56$^a$ bear teat cups 56$^b$ and the tubes of each pair are led to one and the same animal, and intermittent suction impulses are produced in said pair of tubes, the impulses in one tube alternating with those in the other, as will appear more fully in this specification.

The valve 53 is provided with a passage 60 which extends straight through the valve piece, and with a port 61 which leads from the passage 60 out through the side of the valve piece, whereby three ports are formed in the valve, two of which are opposite each other, and the third opens at a right angle to a line passing through the other two. It is by the oscillation of this valve that the pulsations in the suction effect are caused and controlled. With the valve 53 in the position shown in Fig. 4, air is admitted to the tube 54 and the flexible milking tube. With the valve oscillated through one-fourth of a revolution, the milking tube is placed in communication with the interior of the receptacle 10, and as a partial vacuum is maintained in the receptacle, the milk will be drawn through the flexible tube, the glass tube 54 and the valve 53 into the receptacle. When the valve is again turned through a quarter revolution to the position shown in Fig. 4, communication between the partly exhausted receptacle 10 and the milking tube is cut off and at the same time communication is established between the milking tube and the atmosphere through the passage 62 between the regulating screw 63 and the threaded neck 64 which carries the screw 63. As the successive operations occur rapidly, the quantity of air which flows into the milking tube before the connections are changed is very small and the resulting effect is that of intermittently reducing the suction effect exerted upon the animal, but without fully removing the same.

The operation of oscillating the valve piece 53, and thus causing the pulsations in the vacuum existing in the milking tubes, is effected by suitable means which connect the valves with the main crank shaft 31. The two valves on the same side of the machine are connected together by a rod 65 which extends from one valve to the other. To one of the valves is secured a rod 66 carrying a crank 67, to which is pivoted a connecting rod 68, moving in slide bearings 69 formed in suitable guide plates 70 secured to one of the guide rods 28. The upper end of the rod 68 is connected to a second connecting rod 71 having its upper end pivoted to a crank 72 carried by the crank shaft 31. During the rotation of the crank shaft, the rod 68 is caused to move up and down in its slide bearings and thus to oscillate the crank 67. The oscillation of this crank shifts the two valves connected therewith, the connection being preferably such that one valve is opened when the other is closed, so that if the two tubes leading from the same side of the machine are carried to the same animal, the pulsations in these tubes will alternate with each other. If it be desired that the pulsations occur together, this will be effected by turning one of the valves over to the opposite position, as will be readily understood from an inspection of Fig. 5.

When it is desired to use the machine, it will be placed in position over the top of the can with the edge of the base 13 resting upon the gasket 12 on the can and with the edge of the base inclosed by the upper edge of the ring 11, whereby the cover is positioned on the can. After the milking tubes have been placed in position on the teats of the cow the shaft 31 is set in motion by starting the electric motor 41 or turning the handle 43. The rotation of the shaft 31 operates the pumps alternately and these pumps begin to exhaust the air from the can. If only two of the milking tubes are to be used the hand cocks 55 of the other pulsators are closed to preserve the vacuum. When the vacuum has reached the predetermined degree, as shown by the gage 44, or by the fact that the safety valve 45 is beginning to permit the passage of air into the receptacle, the state of partial vacuum within the receptacle will cause the milk to be forced in through the milking tubes by atmospheric pressure. It has been found by experience with machines which exert a constant sucking effect that injury results therefrom to the animal, and for this reason such machines have proven impractical. Again, in machines in which provision is made merely for successively cutting off and reëstablishing communication between the suction-producing means and the milking tubes, no relief is afforded against the constant sucking effect, because the state of partial rarefaction in the tube is not altered. By the provision of means for admitting air for an instant to the tube, as in the present machine, the tractive effect is for a short interval partly destroyed, and the natural way of drawing out the milk from the udder is exactly simulated.

The object of the glass tube 54, through which the milk must pass on its way to the receptacle, is to afford means whereby, by mere inspection, it may be known whether milk is coming through this particular milking tube or not, and also that it may be known whether the milk has nearly all been extracted. If the milk is flowing slowly there still remains a portion to be extracted, and, as is well known, it is very important that all the milk be taken each time that the animal is milked. If all the milk has been extracted this will be shown by the fact that the tube is empty.

Having thus described my invention, what I claim as new and desire to secure by Letters Patent, is:

1. In a milking machine, a receptacle, means for exhausting said receptacle, a pair of milk ducts, each having a relief port, means for simultaneously opening one relief port and closing the other and thereafter closing said first port and opening said second port, and means connecting said exhausting means and said relief-port controlling means whereby the speed of action of one with respect to the other is maintained constant.

2. In a milking machine, the combination with a receptacle, of a cover therefor, means mounted upon said cover for exhausting said receptacle, a pair of milk ducts having each a relief port, means for simultaneously establishing connection of one of said milk ducts with said receptacle and closing the relief port of that milk duct and cutting off the connection of the other milk duct with said receptacle and opening it to the relief port and afterward reversing these operations, and means mounted upon said cover for operating said exhausting means and duct-controlling means.

3. In a milking machine, the combination with a receptacle, of a removable cover therefor; said cover having mounted thereon means for exhausting said receptacle, a milk duct, and a valve operatively connected with said exhausting means for alternately establishing and breaking connection between said milk duct and said receptacle, and for alternately establishing and breaking connection between said milk duct and the air.

4. In a milking machine, the combination of a receptacle and a removable cover therefor; said cover having mounted thereon means for exhausting said receptacle, a pair of milk ducts having each a relief port, and means for simultaneously opening one relief port and closing the other and thereafter closing said first port and opening said second port, and means for maintaining the rate of operation of said exhausting means fixed with respect to said relief-port controlling means.

5. In a milking machine, the combination of a receptacle and a removable cover therefor; said cover having mounted thereon means for exhausting said receptacle, a pair of milk ducts communicating with said receptacle and arranged for the attachment of milking tubes, and means operatively connected with said exhausting means for momentarily reducing the vacuum in said ducts alternately.

6. In a milking machine, the combination of a receptacle and a removable cover therefor; said cover having mounted thereon a pump, a pair of milk ducts communicating with said receptacle and each adapted for the attachment of a tube, means for breaking the communication of said ducts with said receptacle alternately, means for reducing the vacuum in each duct simultaneously with the breaking of its connection with said receptacle, and means connecting said pump and vacuum-producing means together to cause the same to operate at fixed relative speeds.

7. In a milking machine, the combination of a receptacle and a removable cover therefor; said cover having mounted thereon a frame, a pair of pumps, a crank shaft carried by said frame and connected to operate said pumps alternately, a pair of milk ducts discharging into said receptacle and adapted for the attachment of two tubes for one animal, each duct having a valve acting in reverse order to the other and adapted to simultaneously close its duct to said receptacle and open it to the atmosphere and thereafter reverse this operation, thereby causing alternate pulsations in the vacuum in said ducts, and operative connections between said crank shaft and said valves.

8. In a milking machine, the combination of a receptacle and a removable cover therefor; said cover having mounted thereon a frame, a pair of pumps, driving means carried by said frame and connected to operate said pumps alternately, a pair of milk ducts each communicating with said receptacle and adapted for the attachment of a tube, each duct having a valve adapted to simultaneously close its duct to said receptacle and open it to the atmosphere and thereafter reverse this operation, thereby causing pulsations in the vacuum in said ducts, operative connection between said driving means and said valves.

9. In a milking machine, the combination of a receptacle and a removable cover therefor; said cover having mounted thereon means for exhausting the air from said receptacle, a duct communicating with said receptacle and adapted for the connection of a tube therewith, said duct having a relief port, and an oscillating valve in said duct operatively connected with said exhausting means and adapted to close said duct and simultaneously open said port, and thereafter to open said duct and close said port.

10. In a milking machine, the combination of a receptacle, means for exhausting the air therefrom, and a removable cover for said receptacle; said cover having mounted thereon a duct communicating with said receptacle, and adapted for the attachment of a tube, a rocking valve in said duct operatively connected with said exhausting means and arranged to close said duct and open said tube to the atmosphere, and thereafter to open said duct and close said tube from the atmosphere.

11. In a milking machine, the combination of a receptacle, means for exhausting the air from said receptacle, and a removable cover for said receptacle; said cover having mounted thereon a pair of ducts communicating with said receptacle, and adapted for the attachment of tubes, a rocking valve in each of said ducts adapted when in one operative position to close said duct and vent said tube, and when in another operative position to open said duct and close the vent, and means for operating said valves, said means being arranged to cause one valve to open upon the closing of the other valve, and to close upon the opening of said other valve.

12. In a milking machine, the combination of a receptacle and a removable cover therefor; said cover having mounted thereon vacuum producing means and two pairs of pulsation valves, each valve of either pair operating alternately with respect to the other valve of the pair, each pair projecting away from the center of the machine and in a direction opposite to the other pair, and means associated with each pulsation valve for attachment of a tube, said last named means being so arranged that one pair of tubes may extend away from the machine in one direction and the other pair in the opposite direction, whereby two cows may be milked at once.

13. In a milking machine, the combination with a portable milk receiving receptacle and a cover therefor, of exhaust means mounted on said cover for producing a partial vacuum in said receptacle, a portable electric motor carried by said cover, power transmitting mechanism operatively connecting said exhaust means with the motor, a milk duct opening into said receptacle, and a pulsator mounted on said cover for causing pulsations in said milk duct, said pulsator being driven from the motor.

14. In a milking machine, the combination with a receptacle, of means for exhausting said receptacle, a milk duct leading to said receptacle, said duct having a relief port, a valve arranged to connect said milk duct alternately with said relief port and said receptacle, and operative connections between said exhaust means and said valve whereby a reciprocatory rotary movement is imparted to said valve when said exhaust means is in operation.

15. In a milking machine, the combination with a receptacle, of a removable cover therefor, means mounted on said cover for exhausting said receptacle, a plurality of pairs of pulsation valves mounted on said receptacle, and a milk duct controlled by each of said pulsation valves and arranged for the attachment thereto of a milking tube, each of said milk ducts having a portion thereof made transparent.

In witness whereof, I have hereunto subscribed my name in the presence of two witnesses.

THEODORE UMRATH.

Witnesses:
CHARLES G. COPE,
CHARLES L. HOPKINS.